(12) United States Patent
Nishimaki et al.

(10) Patent No.: US 8,744,742 B2
(45) Date of Patent: Jun. 3, 2014

(54) RUNNING CONTROL DEVICE, AND RUNNING CONTROL METHOD

(75) Inventors: Shuhei Nishimaki, Atsugi (JP); Yasuhisa Hayakawa, Atsugi (JP); Masahiro Kobayashi, Atsugi (JP); Ko Sato, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 228 days.

(21) Appl. No.: 13/055,979

(22) PCT Filed: Jun. 12, 2009

(86) PCT No.: PCT/JP2009/060727
§ 371 (c)(1),
(2), (4) Date: Feb. 22, 2011

(87) PCT Pub. No.: WO2010/013547
PCT Pub. Date: Feb. 4, 2010

(65) Prior Publication Data
US 2011/0137487 A1    Jun. 9, 2011

(30) Foreign Application Priority Data
Jul. 29, 2008  (JP) .................. 2008-194633

(51) Int. Cl.
*G08G 1/16*   (2006.01)
*B62D 6/00*   (2006.01)
*G01S 13/93*  (2006.01)
*B60W 30/08*  (2012.01)
*B60W 30/12*  (2006.01)

(52) U.S. Cl.
CPC ............... *G01S 13/931* (2013.01); *B62D 6/002* (2013.01); *G01S 2013/9342* (2013.01); *B60W 30/08* (2013.01); *B60W 30/12* (2013.01); *G08G 1/16* (2013.01)
USPC ............................................ 701/301; 701/41

(58) Field of Classification Search
USPC .......... 701/23, 26, 41, 300, 301, 28; 340/435, 340/436
See application file for complete search history.

(56) References Cited

U.S. PATENT DOCUMENTS 6,138,062 A * 10/2000 Usami ........................... 701/41
6,269,308 B1   7/2001 Kodaka et al.
(Continued)

FOREIGN PATENT DOCUMENTS

CN    1907750 A    2/2007
CN    1926002 A    3/2007
(Continued)

*Primary Examiner* — Helal A Algahaim
*Assistant Examiner* — Dale W Hilgendorf
(74) *Attorney, Agent, or Firm* — Foley & Lardner LLP

(57) ABSTRACT

A lateral object that exists on a side of the vehicle is detected. When an estimated later-arriving lateral position reaches a predetermined threshold value under the condition in which the lateral object is detected, a lane change of the vehicle in a direction to a side of the lateral object is suppressed. When detecting that the vehicle moves laterally in a direction opposite to a side of a side vehicle, an avoidance flag is set to Fa=1. Subsequently, when the vehicle starts a lateral movement in a direction to the side of the side vehicle, a return flag is set to Fr=1. When the return flag is set to Fr=1 in this way, a suppression flag is set to F=0 until a setting time elapses, then the suppression of the lateral movement is forbidden.

11 Claims, 7 Drawing Sheets

(56) References Cited

U.S. PATENT DOCUMENTS

| | | |
|---|---|---|
| 7,136,755 B2 * | 11/2006 | Yamamura .................... 701/301 |
| 7,725,228 B2 | 5/2010 | Kobayashi et al. |
| 2004/0016870 A1 * | 1/2004 | Pawlicki et al. ........... 250/208.1 |
| 2005/0012604 A1 | 1/2005 | Takahashi |
| 2005/0228588 A1 * | 10/2005 | Braeuchle et al. ............ 701/301 |
| 2005/0267660 A1 * | 12/2005 | Fujiwara et al. ................ 701/41 |
| 2007/0032914 A1 | 2/2007 | Kondoh et al. |
| 2007/0219720 A1 * | 9/2007 | Trepagnier et al. ........... 701/300 |
| 2009/0138201 A1 | 5/2009 | Eckstein et al. |

FOREIGN PATENT DOCUMENTS

| | | |
|---|---|---|
| DE | 10 2004 054 720 A1 | 5/2006 |
| JP | 2004-249889 A | 9/2004 |
| JP | 2006-315491 A | 11/2006 |
| JP | 2007-30696 A | 2/2007 |
| JP | 2008-56136 A | 3/2008 |

* cited by examiner

RUNNING CONTROL DEVICE, AND RUNNING CONTROL METHOD

TECHNICAL FIELD

The present invention relates to a running control device and a running control method, which avoids a minor collision with a lateral object when a vehicle moves in a lateral direction at lane change etc.

BACKGROUND ART

There have been a device and a method, which suppress an abrupt change of a steering reaction force by detecting a side vehicle that exists at a side of a vehicle and providing the steering reaction force to a steering wheel in accordance with a risk potential against this side vehicle and changing a gain of the steering reaction force in accordance with a relative speed of the vehicle to the side vehicle and a distance from the side vehicle (see Patent Document 1).

CITATION LIST

Patent Document 1: Japanese Patent Provisional Publication Tokkai No. JP2004-249889

SUMMARY OF THE INVENTION

Technical Problem

For example, when a driver finds an uneven spot or an obstacle on a road ahead of the vehicle during travel and avoids this uneven spot or obstacle by a steering operation, the vehicle moves laterally in an avoidance direction then again moves laterally in a return direction. Here, a case where the side vehicle exists in an adjacent lane in this return direction will be considered. In this case, in a related art disclosed in the above Patent Document 1, because the steering reaction force is provided in accordance with the relative speed of the vehicle to the side vehicle and the distance from the side vehicle, if the driver simply attempts to return to a lateral position where the vehicle had been running before the vehicle avoided the uneven spot or the obstacle, an unnecessary steering reaction force is generated and the driver feels odd or awkward feeling.

An object of the present invention is to restrict an unnecessary control intervention at a scene where the vehicle avoids the obstacle etc. ahead of the vehicle by steering.

Solution to Problem

A running control device of the present invention is a device that detects a lateral object which exists on a side of a vehicle, estimates a later-arriving lateral position at which the vehicle arrives after a lapse of a predetermined time, with respect to a traffic lane, suppresses a lateral movement of the vehicle in a direction to a side of the lateral object when judging that the later-arriving lateral position reaches a position of the lateral object side with respect to a predetermined lateral position under a condition in which the lateral object is detected, and restricts the suppression of the lateral movement after detecting that the vehicle laterally moves in a direction opposite to the side of the lateral object.

Effects of Invention

According to the running control device of the present invention, for example, in a case where the running control device detects that the vehicle moves laterally in a direction opposite to the side of the lateral object to avoid the obstacle etc. existing ahead of the vehicle by steering, when the vehicle moves laterally in the direction of the side of the lateral object after the avoidance, suppression of this lateral movement is restricted, thereby restricting the unnecessary control intervention. That is to say, it is possible to restrict the intervention of the unnecessary control that suppresses the lateral movement operated by the driver to simply attempt to return to the lateral position where the vehicle had been running before the avoidance.

EMBODIMENTS FOR CARRYING OUT THE INVENTION

In the following description, embodiments of the present invention will be explained with reference to drawings.

Figure 1:
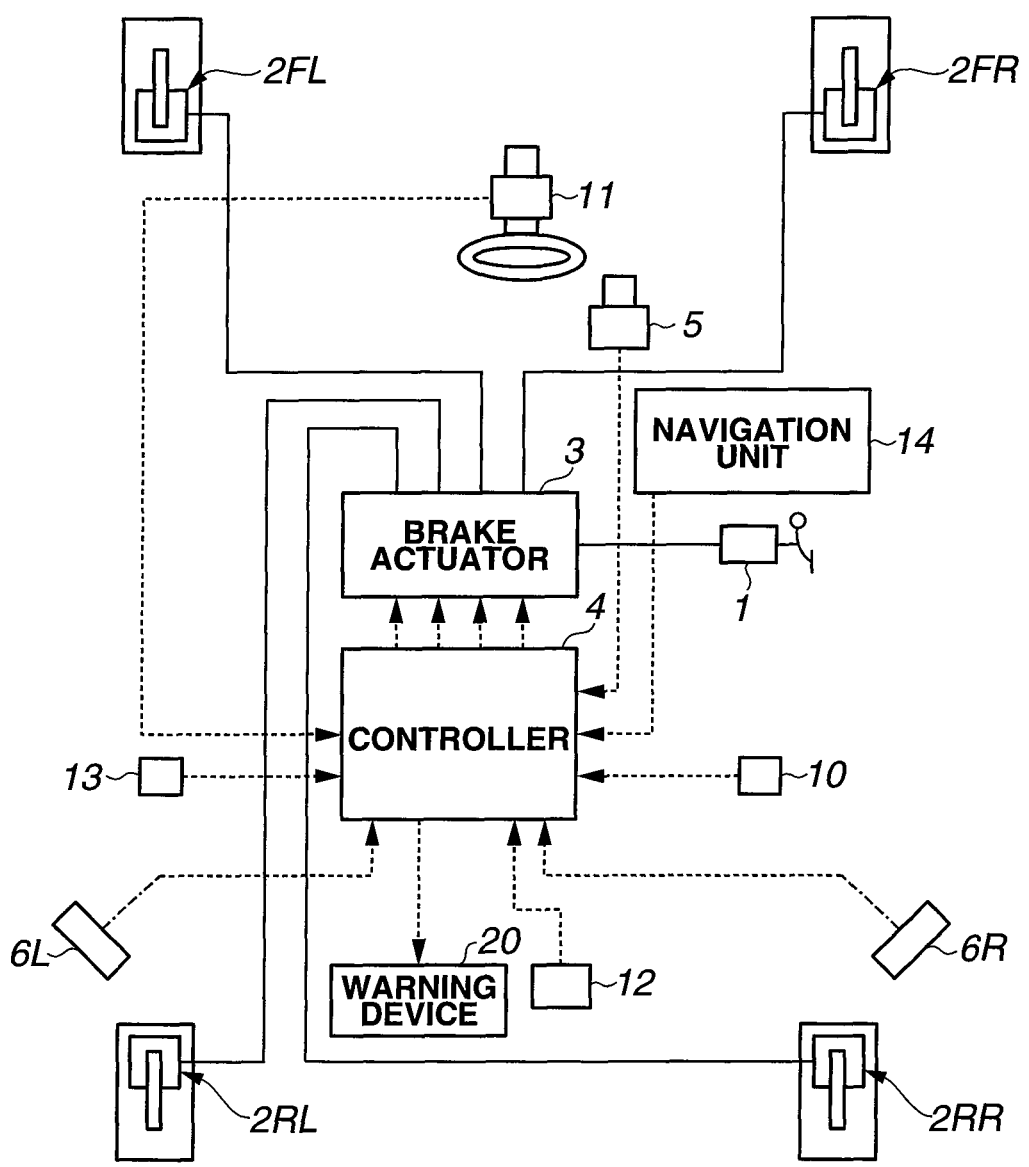
FIG. 1 is a schematic configuration of a vehicle.

First Embodiment (Configuration)
FIG. 1 is a schematic configuration of the present invention. Between a master cylinder 1 and each wheel cylinder 2*i* (i=FL, FR, RL and RR), a brake actuator 3 used for an anti-skid control (ABS), a traction control (TCS), a stability control (VDC: Vehicle Dynamics Control), etc. is installed. This brake actuator 3 has a hydraulic system such as a solenoid valve and a pump, and by controlling drive of these solenoid valve and pump by a controller 4, a hydraulic pressure of each wheel cylinder 2*i* can be individually controlled irrespective of a braking operation by a driver.

Further, a camera 5 that captures a vehicle front or a condition ahead of the vehicle is provided. An image processing device (not shown) recognizes a lane marker such as a white line on the basis of captured image data and detects a traffic lane. The image processing device also calculates a yaw angle $\phi$ of the vehicle with respect to the traffic lane, a lateral displacement X with respect to the traffic lane and a curvature $\rho$ of the traffic lane, and each signal is inputted from the image processing device and the camera 5 to the controller 4. In a case where the white line is not present on a road, the traffic lane can be estimated on the basis of an edge of the road, a guard rail, a curb, etc.

Here, in the present invention, "lateral" of "lateral direction", "lateral position", etc. means a traffic lane width direction.

With regard to the calculation of the yaw angle φ, an actual measurement by the image data can be used, or the yaw angle φ could be calculated as follows. Here, dX is a variation per unit time of the lateral displacement X, and dY is a variation per unit time of a headway distance. dX' is a differential value of dX.

$$\phi = \tan^{-1}(dY/dX)$$
$$= \tan^{-1}(V/dX')$$

With regard to the calculation of the curvature ρ, it could be obtained from an after-mentioned navigation unit 14.

On the other hand, radar devices 6L·6R, for example, using millimeter wave are provided at both left and right sides of the vehicle. The radar devices 6L·6R detect a lateral object that exists on a side (slightly rear side) of the vehicle which could be a blind spot of the driver. The radar devices 6L·6R detect whether the lateral object exists in a predetermined area around the vehicle, namely that the radar devices 6L·6R detect the presence or absence of the lateral object. Also the radar devices 6L·6R could detect a relative distance in a lateral direction of the vehicle, a relative distance in front and rear directions of the vehicle and a relative speed of the vehicle.

A master cylinder pressure Pm detected by a pressure sensor 10, a steering angle δ detected by a steering wheel angle sensor 11, each road wheel speed $Vw_i$ detected by a road wheel speed sensor 12 and an operating condition of a direction indicator switch 13 are also inputted to the controller 4. In addition, a longitudinal acceleration Yg, a lateral acceleration Xg, a yaw rate Ψ, of the vehicle, current vehicle position information and road information are obtained from the navigation unit 14, and are inputted to the controller 4. The navigation unit 14 has the Global Positioning System (hereinafter, called GPS), and detects the vehicle position by this GPS.

In a case where there is directivity or directional property of right and left directions in each data, in any case, the left direction is set to a positive value, and the right direction is set to a negative value. That is, with respect to the yaw angle φ and the steering angle δ, in a case of left turn, they are positive values, while in a case of right turn, they are negative values. With regard to the lateral displacement X, in a case where the vehicle deviates in a left direction from a traffic lane center, it is a positive value, while in a case where the vehicle deviates in a right direction from the traffic lane center, it is a negative value.

Further, a warning device 20 is provided. The warning device 20 sounds a warning sound or turns on a warning lamp in response to a warning signal outputted from the controller 4.

In the controller 4, a conventional lane departure prevention control process and an after-mentioned lane change warning control process are carried out. The lane departure prevention control is a control that warns the driver when the vehicle is in a state of departure from the traffic lane, or generates a yaw moment to the vehicle so as to prevent the departure from the traffic lane. Since this lane departure prevention control is a known control, its explanation will be omitted here.

Figure 2:
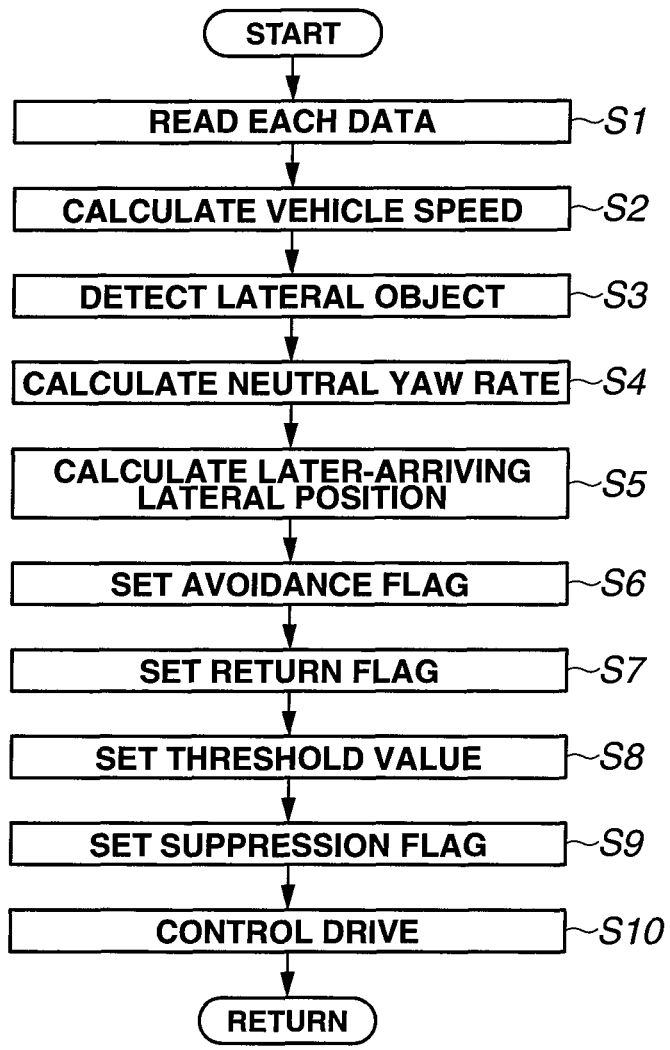
FIG. 2 is a flow chart showing a lane change warning control process of a first embodiment.

Next, the lane change warning control process executed as a timer interrupt at each certain time (e.g. 10 msec) in the controller 4 will be explained with reference to a flow chart in FIG. 2.

First, at step S1, each data is read.

At step S2, an average road wheel speed of a non-driving wheel (a driven wheel) is calculated as a vehicle speed V, as follows. Here, if the average road wheel speed can be obtained from the anti-skid control or the information of the navigation, its value obtained could be used.

In a case of front wheel drive:

$$V=(Vw_{RL}+Vw_{RR})/2$$

In a case of rear wheel drive:

$$V=(Vw_{FL}+Vw_{FR})/2$$

At step S3, on the basis of a detection result of the radar devices 6L·6R, the presence or absence of the lateral object is judged.

At subsequent step S4, as shown below, a neutral yaw rate $\Psi_P$ required to keep a driving route is calculated according to the curvature ρ and the vehicle speed V.

$$\Psi_p = \rho \times V$$

At step S5, by the following manner 1 or 2, a later-arriving lateral position Xf at which the vehicle arrives after a lapse of a headway time Tt (e.g. approx. 1 sec) is calculated.

1. The later-arriving lateral position Xf is calculated according to the yaw angle φ, a target yaw rate Ψm and a target yaw angle acceleration Ψm'.

In the calculation here, as shown below, the yaw angle φ, the target yaw rate Ψm and the target yaw angle acceleration Ψm' are added together with a weight added to each of the yaw angle φ, the target yaw rate Ψm and the target yaw angle acceleration Ψm'. K1~K3 are gains. K1 is a value obtained by multiplying the headway time Tt by the vehicle speed V. K2 is a value obtained by multiplying a predetermined value by the vehicle speed V. K3 is a value obtained by multiplying a predetermined value by the vehicle speed V.

$$Xf = K1 \times \phi + K2 \times \Psi m + K3 \times \Psi m'$$

The target yaw rate Ψm and the target yaw angle acceleration Ψm' are calculated according to the following expressions. Ψh is a value obtained by subtracting the above-mentioned neutral yaw rate $\Psi_P$ from a reference yaw rate Ψd that is determined according to the steering angle δ and the vehicle speed V.

$$\Psi = \Psi h \times Tt$$

$$\Psi' = \Psi' \times Tt^2$$

2. The later-arriving lateral position Xf is calculated according to the target yaw rate Ψm and the target yaw angle acceleration Ψm'.

In the calculation here, as shown below, a weight is added to each of the target yaw rate Ψm and the target yaw angle acceleration Ψm', then the later-arriving lateral position Xf is calculated by performing "select-high".

$$Xf = \max[K2 \times \Psi m, K3 \times \Psi m']$$

At subsequent step S6, a judgment is made as to whether or not the vehicle starts a lateral movement in a direction opposite to a side of the lateral object. The lateral movement of the vehicle and its direction are detected on the basis of the steering angle δ and a lateral speed Vx of the vehicle with respect to the white line. The lateral speed Vx is calculated by any of the following manner 1~4.

1. The lateral speed Vx is calculated on the basis of the vehicle position and the road information.

First, the traffic lane of the vehicle position is detected by referring to the road information, and the yaw angle φ of the vehicle with respect to the traffic lane is calculated from a state of change of the vehicle position. Then, as shown below, the lateral speed Vx is calculated according to the yaw angle φ and the vehicle speed V.

$$Vx = V \times \sin \phi$$

2. The lateral speed Vx is calculated on the basis of the image data.

First, the white line is detected on the basis of the image data, and the yaw angle φ of the vehicle with respect to this white line is calculated. Then, the lateral speed Vx is calculated according to the yaw angle φ and the vehicle speed V. Here, the lateral speed Vx could be calculated by calculating a lateral position Xe of the vehicle with respect to the white line and differentiating this lateral position Xe, without the calculation according to the yaw angle φ and the vehicle speed V.

3. The lateral speed Vx is calculated on the basis of the steering angle δ.

First, as shown below, a steering variation Δδ from a neutral steering angle $\delta_0$ is calculated. This neutral steering angle $\delta_0$ could be a value obtained by performing a process of a large-time-constant filtering against the steering angle δ.

$$\Delta\delta = \delta_0 - \delta$$

Then by using a common expression, the yaw rate Ψ according to the steering variation Δδ is calculated.

Further, as shown below, by integrating the yaw rate Ψ with respect to time, the yaw angle φ is calculated.

$$\phi = \int \Psi dt$$

Then, as described above, the lateral speed Vx is calculated according to the yaw angle φ and the vehicle speed V.

4. The lateral speed Vx is calculated by combining the above 1~3.

For instance, an average is calculated, "select-low" is performed, or an addition is done after adding the weight.

Then, when the vehicle starts to the lateral movement in the opposite direction to the side of the lateral object, an avoidance flag is set to Fa=1. On the other hand, when the vehicle does not start to the lateral movement in the opposite direction to the side of the lateral object, the avoidance flag is set to Fa=0 (the avoidance flag is reset). With regard to the avoidance flag, a state of Fa=1 is maintained while the vehicle is moving laterally in the opposite direction to the lateral object. When a predetermined time elapses from a time point at which the lateral movement of the vehicle in the opposite direction ends, or when an after-mentioned return flag is set to Fr=1, the avoidance flag is automatically set to Fa=0 (the avoidance flag is automatically reset).

At subsequent step S7, under the condition in which the avoidance flag is set to Fa=1, this time, a judgment is made as to whether or not the vehicle starts a lateral movement in a direction to the side of the lateral object. Regarding the lateral movement of the vehicle and its direction, they are detected in the same manner as step S6.

When the vehicle starts to the lateral movement in the direction to the side of the lateral object, the return flag is set to Fr=1. On the other hand, when the vehicle does not start to the lateral movement in the direction to the side of the lateral object, the return flag is set to Fr=0 (the return flag is reset). With regard to the return flag, when a setting time Tm elapses from a time point at which the return flag is set to Fr=1, the return flag is automatically set to Fr=0 (the return flag is automatically reset). The setting time Tm corresponds to a time required for the vehicle to return to an initial lateral position when the avoidance flag is set to Fa=1 from a current lateral position of the vehicle with respect to the traffic lane.

Here, a setting manner of the setting time Tm will be explained.

First, an integral value ∫δ of the steering angle δ or an integral value ∫Vx of the lateral speed Vx, when the avoidance flag is set to Fa=1, is calculated.

Figure 3:
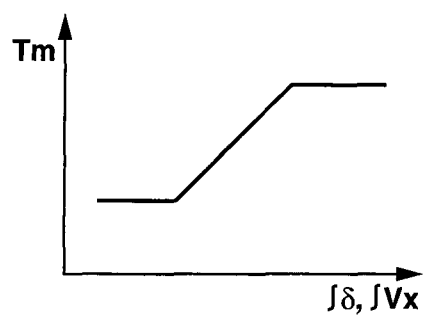
FIG. 3 is a map used for calculating a setting time Tm.

Then, by referring to a map in FIG. 3, the setting time Tm is set in accordance with any of the integral value ∫δ and the integral value ∫Vx. In this map, a horizontal axis is the integral value ∫δ or the integral value ∫Vx, and a vertical axis is the setting time Tm. The map is set so that the greater the integral value ∫δ or the integral value ∫Vx is, the larger the setting time Tm.

At step S8, a threshold value (which is a predetermined lateral position, hereinafter, simply called threshold value) XL that suppresses a lane change is set.

Figure 4:
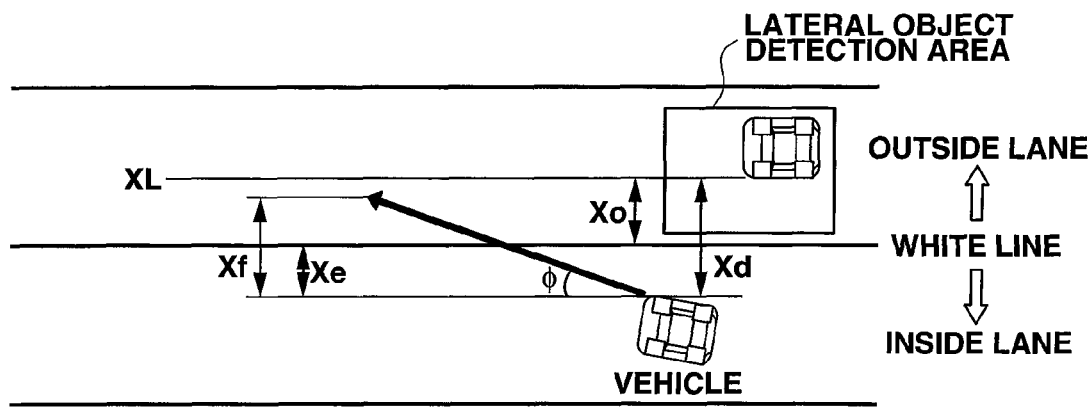
FIG. 4 is an example of a scene at which a side vehicle exists.

In this setting here, a current lateral position of the lateral object with respect to the white line is set to the threshold value XL. Here, as shown in FIG. 4, this lateral position is a lateral position when supposing that the lateral object (a side vehicle) exists at a predetermined outside position that is separate from the white line by a predetermined value Xo.

Thus, the current lateral position Xe is calculated first. This calculation is done on the basis of the image data or by integrating the lateral speed Vx with respect to time. As a matter of course, an average of these values could be calculated, or the "select-low" could be performed, or an addition could be done after adding the weight.

Then, as shown below, the distance Xo from the white line to the lateral object is added to the current lateral position Xe, and this value is set to the threshold value XL. As a matter of course, if a relative distance Xd, in the lateral direction, of the vehicle to the lateral object is able to be detected, a lateral position that is separate from the current lateral position Xe by the relative distance Xd is set to the threshold value XL. Or the current lateral position of the lateral object is not set to the threshold value XL, but a position of the white line could be set to the threshold value XL.

$$Xe + Xo \rightarrow XL$$

At subsequent step S9, a judgment is made as to whether or not the later-arriving lateral position Xf at which the vehicle arrives after a lapse of the headway time Tt is the threshold value XL or greater. If this judgment result is Xf<XL, it is judged that there is no possibility that the vehicle will touch or hit against the lateral object, and a suppression flag is set to F=0 (a suppression flag is reset). On the other hand, if the judgment result is Xf≥XL, it is judged that there is a possibility that the vehicle will touch or hit against the lateral object, and the suppression flag is set to F=1. However, when the return flag is Fr=1, the suppression flag is set to F=0 (the suppression flag is reset).

At this time, in order to prevent hunting of the suppression flag F, hysteresis could be provided to the Xf, or the reset of the suppression flag F could be inhibited until a predetermined time elapses from a time point at which the suppression flag is set to F=1. Further, when the predetermined time elapses from the time point at which the suppression flag is set to F=1, the suppression flag may be automatically set to F=0 (the suppression flag may be automatically reset). Or in a case where the anti-skid control, the traction control and the stability control etc. are carried out, in order for these controls to take priority, the suppression flag could be set to F=0 (the suppression flag could be reset).

At subsequent step S10, a target yaw moment Ms is calculated, and drive of the brake actuator 3 is controlled according to the calculated target yaw moment Ms.

First, when the suppression flag is F=0, the target yaw moment Ms is set to Ms=0.

Figure 5:
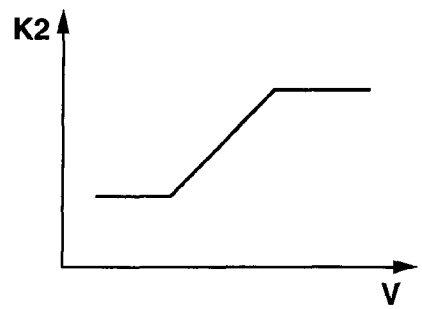
FIG. 5 is a map used for calculating a gain K2.

On the other hand, when the suppression flag is F=1, as shown below, the target yaw moment Ms that suppresses the lane change of the vehicle is calculated. Kr1 is a gain that is determined from specifications of the vehicle. Kr2 is a gain that is determined according to the vehicle speed V. As shown in FIG. 5, Kr2 is set so that the higher the vehicle speed V is, the greater the Kr2.

$$Ms=Kr1 \times Kr2 \times (Km1 \times \phi + Km2 \times \Psi m)$$

According to the above expression, the greater the yaw angle ϕ and the target yaw rate Ψm are, the greater the target yaw moment Ms that suppresses the lane change of the vehicle becomes.

Then, target hydraulic pressures $P_{FL} \sim P_{RR}$ of each wheel cylinder are calculated.

First, when the suppression flag is F=0, it is judged that there is no need to suppress the lane change of the vehicle, and the drive of the brake actuator 3 is stopped, then a master cylinder pressure is supplied to each wheel cylinder, as shown below. Here, Pmr is a rear wheel master cylinder pressure based on ideal allocation of front and rear braking force.

$$P_{FL}=P_{FR}=Pm$$

$$P_{RL}=P_{RR}=Pmr$$

On the other hand, when the suppression flag is F=1, as shown below, a braking force difference ΔPf between left and right wheels and a braking force difference ΔPr between left and right wheels for the purpose of suppressing the lane change, are calculated. T indicates a tread. For the sake of convenience, front and rear treads are the same. Kf and Kr are coefficients of the front wheel side and the rear wheel side for converting the braking force to the hydraulic pressure, and are determined by specifications of the brake. R is a braking force allocation of the front and rear wheels.

$$\Delta Pf = 2 \times Kf \times \{Ms \times R\}/T$$

$$\Delta Pr = 2 \times Kr \times \{Ms \times (1-R)\}/T$$

Thus, in a case where a direction of the lane change is left, in order to provide a yaw moment to a right direction to the vehicle, the target hydraulic pressures $P_{FL} \sim P_{RR}$ of each wheel cylinder are calculated as shown below.

$$P_{FL}=Pm$$

$$P_{FR}=Pm+\Delta Pf$$

$$P_{RL}=Pmr$$

$$P_{RR}=Pmr+\Delta Pr$$

On the other hand, in a case where the direction of the lane change is right, in order to provide a yaw moment to a left direction to the vehicle, the target hydraulic pressures $P_{FL} \sim P_{RR}$ of each wheel cylinder are calculated as shown below.

$$P_{FL}=Pm+\Delta Pf$$

$$P_{FR}=Pm$$

$$P_{RL}=Pmr+\Delta Pr$$

$$P_{RR}=Pmr$$

Then, by controlling the drive of the brake actuator 3, the target hydraulic pressures $P_{FL} \sim P_{RR}$ are generated to the respective wheel cylinders. Also by driving the warning device 20, it gives notice to the driver that the lane change is suppressed, and after that, the control is returned to a given main program.

Here, when suppressing the lane change, there is no need to issue the warning at the same time as this suppression of the lane change. A threshold value that issues the warning and the threshold value XL suppressing the lane change, for the later-arriving lateral position Xf, could be individually prepared. And by setting the threshold value for issuing the warning to be relatively small, the warning could be issued before starting the suppression of the lane change.

(Operation)

As shown in FIG. 4, the driver operates the direction indicator switch 13 to the right direction, and intends to change the lane to the right adjacent lane. On a slightly rear side of the right side of the vehicle which is a blind area of the driver, the side vehicle runs parallel to the vehicle.

At this time, since the driver's intention to change the lane is apparent, the lane departure prevention control is not operated, but the lane change warning control is continuously carried out.

First, by the radar device 6R, the side vehicle is detected (step S3). Then the later-arriving lateral position Xf at which the vehicle arrives after a lapse of the headway time Tt (e.g. 1 sec) is calculated (step S5). And when this later-arriving lateral position Xf reaches the threshold value XL, it is judged that there is a possibility that the vehicle will touch or hit against the side vehicle, and the suppression flag is set to F=1 (step S9). Further, in order to suppress the lane change of the vehicle to the right direction, the yaw moment to the left direction is generated by the braking force difference between the left and right wheels, also the warning device gives notice to the driver that the lateral object exists (step S10). With this control, the driver recognizes or notices the side vehicle, then this can prompt the driver to wait the lane change until the side vehicle passes by.

Figure 6:
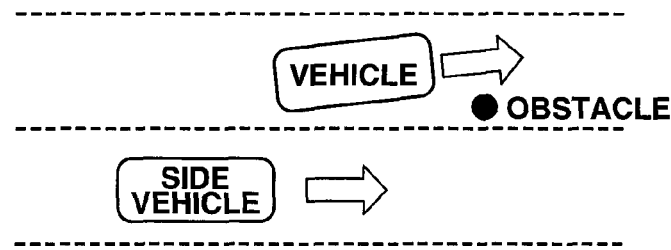
FIG. 6 is an example of a scene at which the vehicle avoids an obstacle by steering.

Here, for example, as shown in FIG. 6, when the driver finds an uneven spot or an obstacle on the road ahead of the vehicle in the travelling and avoids this uneven spot or obstacle by the steering operation, the vehicle moves laterally in an avoidance direction then again moves laterally in a return direction. Further, a case where the side vehicle exists in the adjacent lane in this return direction will be considered. At this time, this is judged to be the lane change to the adjacent lane, then it is conceivable that the above control suppressing the lane change will work. However, if the driver simply attempts to return to a lateral position where the vehicle had been running before the vehicle avoided the uneven spot or the obstacle, this control becomes an unnecessary control intervention, and the driver feels odd or awkward feeling.

Thus, in the present embodiment, when detecting that the vehicle moves laterally in a direction opposite to a side of the side vehicle, the avoidance flag is set to Fa=1 (step S6). Subsequently, when the vehicle starts the lateral movement in a direction to the side of the side vehicle, the return flag is set to Fr=1 (step S7). When the return flag is set to Fr=1 in this way, the suppression flag is set to F=0 (the suppression flag is reset) until the setting time Tm elapses, then the suppression of the lateral movement is inhibited or forbidden (step S9). With this control, it is possible to restrict the intervention of the unnecessary control that suppresses the lateral movement operated by the driver to simply attempt to return to the lateral position where the vehicle had been running before the avoidance.

At this time, the setting time Tm is set so that the greater the integral value ∫δ of the steering angle δ or the integral value ∫Vx of the lateral speed Vx when the vehicle moves laterally in the opposite direction to the side of the side vehicle, the longer the setting time Tm is. This reason is that the greater the amount of the lateral movement to avoid the obstacle is, the more the amount of the lateral movement to return to the lateral position before the avoidance increases.

When the setting time Tm elapses, it is judged that the vehicle returns to the lateral position where the vehicle had been running before the vehicle avoided, and the return flag is set to Fr=0 (the return flag is reset), then the control is returned to a state in which the control suppressing the lane change can be carried out.

The lane change warning control is carried out separately from the lane departure prevention control. That is, even if the vehicle is not in the state of departure from the traffic lane, when the lateral object is detected, a risk of touching or hitting against this lateral object is considered, and the lateral movement in the direction to the side of the lateral object is suppressed.

(Example of Application)

In the present embodiment, the suppression of the lateral movement is inhibited or forbidden until the setting time Tm elapses from the time point at which the lateral movement of the vehicle in the return direction is detected. However, the present invention is not limited to this. The suppression of the lateral movement could be inhibited or forbidden in accordance with the lateral position of the vehicle. The point is, until the vehicle returns to the initial lateral position before the vehicle avoids the obstacle, the suppression of the lateral movement in the return direction is inhibited or forbidden. Therefore, the initial lateral position at which the vehicle starts to avoid the obstacle is stored first, then the suppression of the lateral movement could be inhibited or forbidden from a start of the lateral movement of the vehicle in the direction to the side of the side vehicle until the vehicle returns to the initial lateral position.

Further, in the present embodiment, upon the detection of the lateral movement in the opposite direction to the side of the lateral object, subsequently to this detection, when detecting the lateral movement in the direction to the side of the lateral object, the suppression of the lateral movement is inhibited or forbidden. However, the present invention is not limited to this. The suppression of the lateral movement in the return direction could be inhibited or forbidden from a time point at which the lateral movement in the opposite direction to the side of the lateral object is detected.

Furthermore, in the present embodiment, although the target yaw moment Ms is achieved by the braking and driving force difference between the left and right wheels, the present invention is not limited to this. For example, by providing torque that is opposite direction to the lane change to a steering system through e.g. a power steering, the target yaw moment Ms might be achieved.

(Effect)

In the present invention described above, the radar devices 6L·6R correspond to a lateral object detecting means. The process of step S5 corresponds to a later-arriving position estimating means. The process of step S6 corresponds to an avoidance movement detecting means. The process of step S7 corresponds to a return movement detecting means. The process of step S8 corresponds to a threshold value setting means. The process of step S9 corresponds to a restricting means. The process of step S10 corresponds to a running controlling means.

(1) A running control device has: a lateral object detecting means that detects a lateral object which exists on a side of a vehicle; a later-arriving position estimating means that estimates a later-arriving lateral position at which the vehicle arrives after a lapse of a predetermined time, with respect to a traffic lane; a running controlling means that suppresses a lateral movement of the vehicle in a direction to a side of the lateral object when judging that the later-arriving lateral position estimated by the later-arriving position estimating means reaches a threshold value (a position of the lateral object side with respect to a predetermined lateral position) under a condition in which the lateral object detecting means detects the lateral object; an avoidance movement detecting means that detects that the vehicle laterally moves in a direction opposite to the side of the lateral object; and a restricting means that restricts the suppression of the lateral movement executed by the running controlling means after the avoidance movement detecting means detects the lateral movement of the vehicle.

With this, it is possible to restrict the intervention of the unnecessary control that suppresses the lateral movement operated by the driver to simply attempt to return to the lateral position where the vehicle had been running before the avoidance.

(2) After the avoidance movement detecting means detects the lateral movement of the vehicle, the restricting means restricts the suppression of the lateral movement executed by the running controlling means so that the greater the lateral movement in the direction opposite to the side of the lateral object, the greater the suppression of the lateral movement in the direction to the side of the lateral object.

With this, the suppression of the lateral movement can be surely restricted.

(3) After the avoidance movement detecting means detects the lateral movement of the vehicle, the restricting means restricts the suppression of the lateral movement executed by the running controlling means so that the greater the lateral speed in the direction opposite to the side of the lateral object, the greater the suppression of the lateral movement in the direction to the side of the lateral object.

With this the suppression of the lateral movement can be surely restricted.

(4) The running control device further has a return movement detecting means that detects that the vehicle laterally moves in the direction to the side of the lateral object after the avoidance movement detecting means detects the lateral movement of the vehicle, and the restricting means restricts the suppression of the lateral movement executed by the running controlling means when the return movement detecting means detects the lateral movement of the vehicle.

With this, it is possible to restrict the suppression of the lateral movement with an accurate timing.

(5) The restricting means restricts the suppression of the lateral movement executed by the running controlling means for a time period from a time point at which the return movement detecting means detects the lateral movement of the vehicle until a current lateral position of the vehicle with respect to the traffic lane returns to an initial lateral position when the avoidance movement detecting means detects the lateral movement of the vehicle.

With this, it is possible to restrict the suppression of the lateral movement only for an appropriate time period.

(6) The restricting means forbids the suppression of the lateral movement executed by the running controlling means.

With this, it is possible to surely prevent the intervention of the unnecessary control.

Second Embodiment (Configuration)

Figure 7:
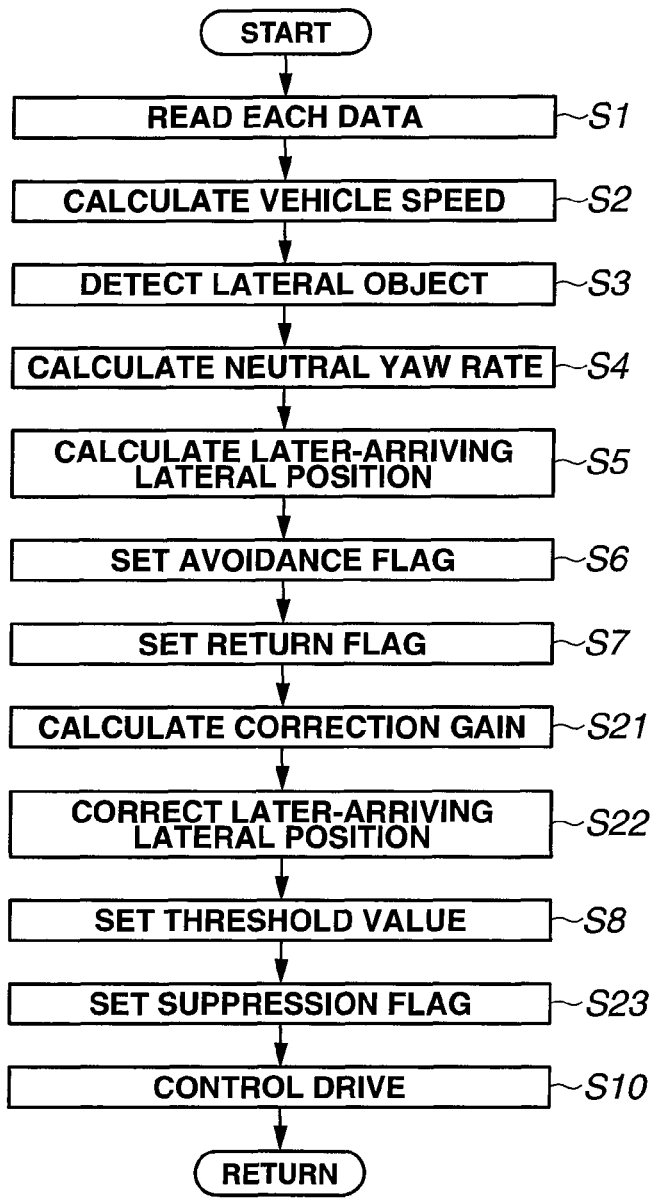
FIG. 7 is a flow chart showing a lane change warning control process of a second embodiment.

In a second embodiment, by correcting the later-arriving lateral position Xf so as to reduce a tendency for the later-arriving lateral position Xf to reach the threshold value XL, the suppression of the lateral movement is restricted, and a lane change warning control process shown in FIG. 7 is carried out.

In this process, after an execution of the above-mentioned step S7, new steps S21 and S22 are added, and the above-mentioned step S9 is changed to a new step S23.

Figure 8:
FIG. 8 is a map used for calculating a correction gain $\alpha$.

At step S21, by referring to a map in FIG. 8, a correction gain α is calculated in accordance with the integral value ∫δ of the steering angle δ or the integral value ∫Vx of the lateral speed Vx. In this map, a horizontal axis is the integral value ∫δ or the integral value ∫Vx, and a vertical axis is the correction gain α. The map is set so that the greater the integral value ∫δ or the integral value ∫Vx is, the smaller the correction gain α with respect to 1.

At subsequent step S22, when the return flag is Fr=1, as show below, the later-arriving lateral position Xf is corrected by the correction gain α. When the return flag is Fr=0, the correction of the later-arriving lateral position Xf is not made.

$$Xf \leftarrow Xf \times \alpha$$

With respect to the return flag in the present embodiment, when a setting time Tc elapses from a time point at which the return flag is set to Fr=1, the return flag is automatically set to Fr=0 (the return flag is automatically reset). The setting time Tc corresponds to a time required for the vehicle to return to an initial lateral position when the avoidance flag is set to Fa=1 from a current lateral position of the vehicle with respect to the traffic lane.

Here, a setting manner of the setting time Tc will be explained.

First, the integral value ∫δ of the steering angle δ or the integral value ∫Vx of the lateral speed Vx, when the avoidance flag is set to Fa=1, is calculated.

Figure 9:
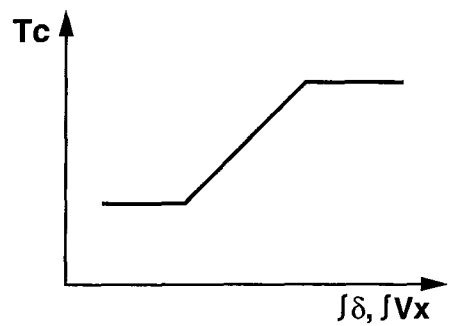
FIG. 9 is a map used for calculating a setting time Tc.

Then, by referring to a map in FIG. 9, the setting time Tc is set in accordance with any of the integral value ∫δ and the integral value ∫Vx. In this map, a horizontal axis is the integral value ∫δ or the integral value ∫Vx, and a vertical axis is the setting time Tc. The map is set so that the greater the integral value ∫δ or the integral value ∫Vx is, the larger the setting time Tc.

On the other hand, at step S23, the suppression flag F is set on the basis of only a comparative result between the later-arriving lateral position Xf and the threshold value XL, without consideration of the return flag Fr.

(Operation)

In the present embodiment, when the return flag is set to Fr=1, until the setting time Tc elapses, the later-arriving lateral position Xf is corrected so as to reduce the tendency for the later-arriving lateral position Xf to reach the threshold value XL.

First, the correction gain α is set in accordance with any of the integral value ∫δ and the integral value ∫Vx (step S21). This correction gain α is set so that the greater the integral value ∫δ or the integral value ∫Vx is, the smaller the value of the correction gain α with respect to 1. Then by multiplying the estimated later-arriving lateral position Xf by the correction gain α, this later-arriving lateral position Xf is corrected (step S22). Thus, when the correction gain α is smaller than 1, the later-arriving lateral position Xf becomes smaller than an original value. At the scene shown in FIG. 4, the later-arriving lateral position Xf then shifts to the left direction.

That is, since the corrected later-arriving lateral position Xf is less apt to exceed (reach) the threshold value XL by an amount equivalent to the correction, a timing of the suppression of the lane change can be delayed. With this, it is possible to restrict the intervention of the unnecessary control that suppresses the lateral movement operated by the driver to simply attempt to return to the lateral position where the vehicle had been running before the avoidance.

At this time, the setting time Tc is set so that the greater the integral value ∫δ of the steering angle δ or the integral value ∫Vx of the lateral speed Vx when the vehicle moves laterally in the opposite direction to the side of the side vehicle, the longer the setting time Tc is. This reason is that the greater the amount of the lateral movement to avoid the obstacle is, the more the amount of the lateral movement to return to the lateral position before the avoidance increases.

This setting time Tc could be set to a different value from the setting time Tm mentioned in the first embodiment. That is, this reason is that, "completely inhibiting or forbidding the suppression of the lateral movement" and "reducing the tendency of the suppression of the lateral movement" are different in the degree of the restriction of the lateral movement, and a time for which the restriction should be applied is also different according to this degree. For instance, the setting time Tc is set to be Tm<Tc, then a time for which the tendency of the suppression of the lateral movement is reduced can be set to be long.

The other operation and effect are the same as the above first embodiment.

(Example of Application)

In the present embodiment, the correction of the later-arriving lateral position Xf that is calculated at step S5 by the correction gain α is done later at the process of step S22. However, the present invention is not limited to this. The corrected later-arriving lateral position Xf could be calculated at the time point at which the later-arriving lateral position Xf is calculated at step S5 with consideration given to the correction gain α.

For example, K1~K3 could be corrected by the correction gain α.

In this case, when employing the manner 1 at step S5, as shown below, a different weight could be added to each of K1~K3. For instance, α1=α, α2=α×K2, α3=α×K3, then setting is done so as to satisfy a relationship of α1>α2>α3.

$$K1 \leftarrow K1 \times \alpha 1$$

$$K2 \leftarrow K2 \times \alpha 2$$

$$K3 \leftarrow K3 \times \alpha 3$$

Likewise, in the case of the 2 at step S5, as shown below, a different weight could be added to each of K2 and K3. For instance, α2=α×K2, α3=α×K3, then setting is done so as to satisfy a relationship of α2>α3.

$$K2 \leftarrow K2 \times \alpha 2$$

$$K3 \leftarrow K3 \times \alpha 3$$

On the other hand, the headway time Tt could be corrected by the correction gain α.

That is, as shown below, the correction is made by multiplying the headway time Tt by the correction gain α.

$$Tt \leftarrow Tt \times \alpha$$

Figure 10:
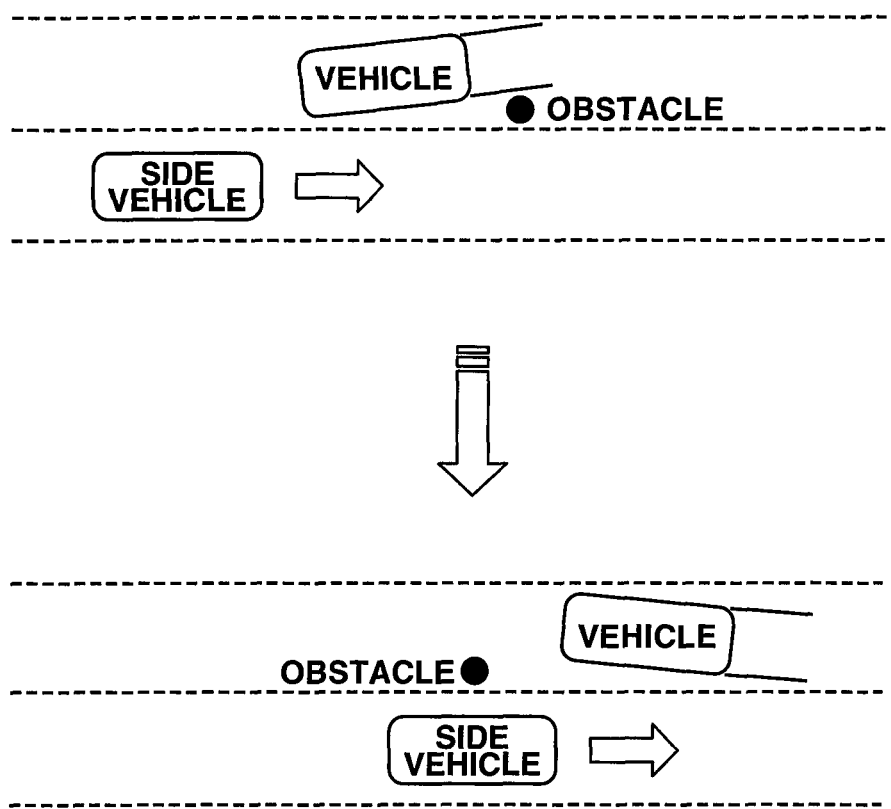
FIG. 10 is an image when a headway time Tt is shortened.

In this case, when the correction gain α is smaller than 1, the headway time Tt becomes smaller than an original value. Then, as shown in FIG. 10, a forward-gaze or watch point that estimates the later-arriving lateral position Xf shifts to the near side to the vehicle. That is, the later-arriving lateral position Xf calculated using this headway time Tt is less apt to exceed the threshold value XL by an amount equivalent to the correction. Therefore, "correcting the headway time Tt by the correction gain α" is equivalent to "correcting the later-arriving lateral position Xf by the correction gain α", then the same operation and effect as the above embodiment can be obtained.

Further, the threshold value XL could be corrected by the correction gain α.

That is, in the present embodiment, since the relative distance Xd when supposing that the lateral object exists at the predetermined outside position that is separate from the white line by the predetermined value Xo is set to the threshold value XL, the correction is made by multiplying the threshold value XL by 1/α, as shown below.

$$XL \leftarrow XL \times (1/\alpha)$$

In this case, when the correction gain α is smaller than 1, the threshold value XL becomes greater than an original value. At the scene shown in FIG. 4, the threshold value XL then shifts to the right direction. That is, the later-arriving lateral position Xf is less apt to exceed the corrected threshold value XL by an amount equivalent to the correction. Therefore, "correcting the threshold value XL by the correction gain α" is equivalent to "correcting the later-arriving lateral position Xf by the correction gain α", then the same operation and effect as the above embodiment can be obtained. As a matter of course, instead of the threshold value XL, the correction might be made by multiplying the predetermined value Xo by 1/α.

Moreover, a detection distance of the radar devices 6L·6R could be corrected by the correction gain α.

That is, since the radar devices 6L·6R detect whether the lateral object exists in the predetermined area around the vehicle, the correction is made by multiplying this detection distance D by the correction gain α, as shown below.

$$D \leftarrow D \times \alpha$$

Figure 11:
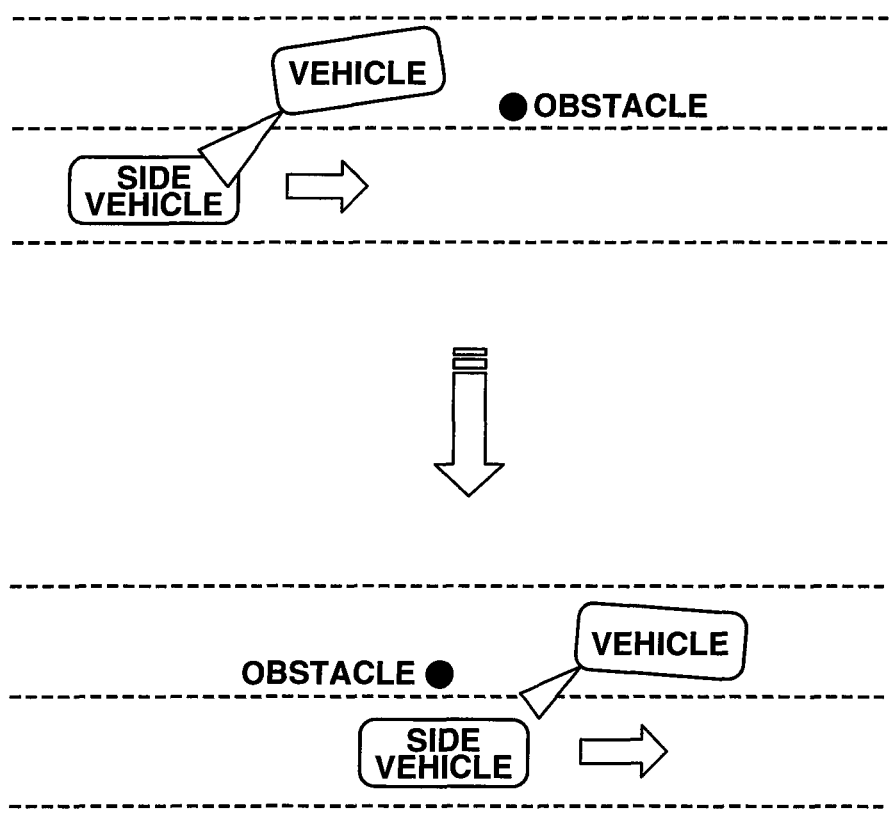
FIG. 11 is an image when a detection distance D is shortened.

In this case, when the correction gain α is smaller than 1, the detection distance D becomes smaller than an original value. Then, as shown in FIG. 11, the detection distance D is shortened. That is, when detecting the presence or absence of the lateral object using this detection distance D, the lateral object is hard to be detected by an amount equivalent to the shortened detection distance D, and thus the tendency of the suppression of the lateral movement is reduced. Therefore, "correcting the detection distance D by the correction gain α" is equivalent to "correcting the later-arriving lateral position Xf by the correction gain α", then the same operation and effect as the above embodiment can be obtained.

(Effect)

In the present invention described above, the processes of steps S21 and S22 correspond to a restricting means.

(1) The restricting means restricts the suppression of the lateral movement executed by the running controlling means by correcting at least one of the later-arriving lateral position and the threshold value so that the later-arriving lateral position estimated by the later-arriving position estimating means is less apt to reach the threshold value.

With this, it is possible to surely restrict the intervention of the unnecessary control.

(2) The restricting means corrects the later-arriving lateral position by correcting the predetermined time.

With this, the later-arriving lateral position Xf is less apt to reach the threshold value XL, and it is possible to surely restrict the intervention of the unnecessary control.

(3) The restricting means restricts the suppression of the lateral movement executed by the running controlling means by correcting a detection area of the lateral object by the lateral object detecting means so as to decrease the detection area.

With this, it is possible to surely restrict the intervention of the unnecessary control.

Third Embodiment (Configuration)

Figure 12:
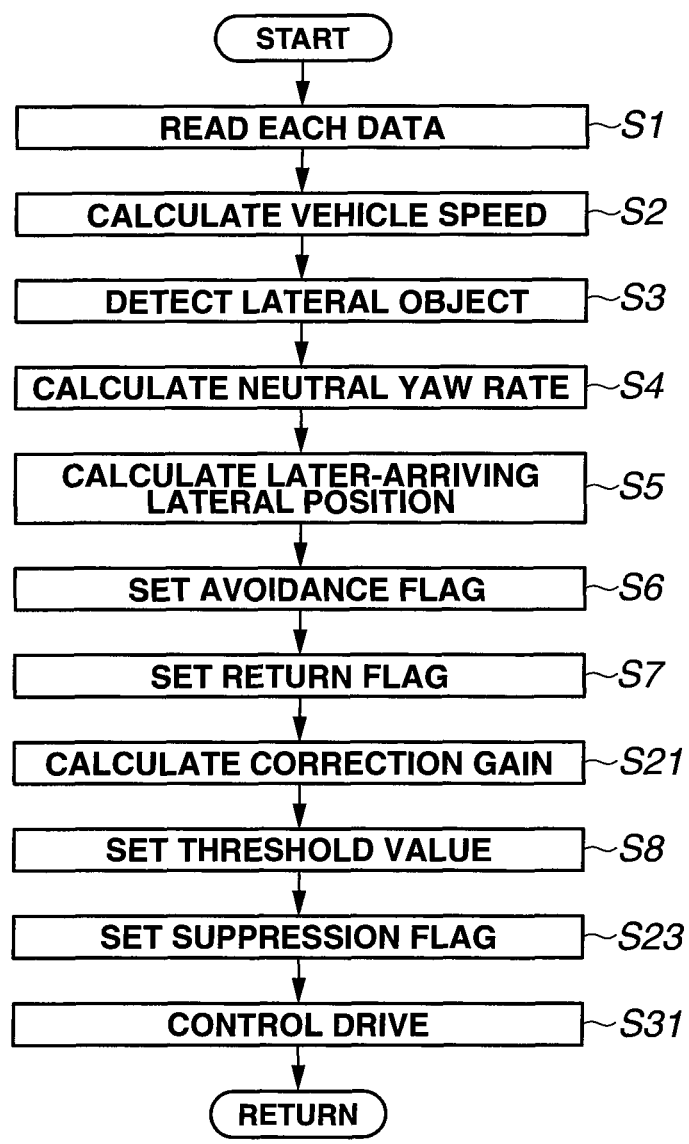
FIG. 12 is a flow chart showing a lane change warning control process of a third embodiment.

In a third embodiment, by correcting the target yaw moment Ms so as to decrease the target yaw moment Ms, the suppression of the lateral movement is restricted, and a lane change warning control process shown in FIG. 12 is carried out.

In this process, the above-mentioned step S22 is deleted, and the above-mentioned step S10 is changed to a new step S31.

At step S31, when the return flag is Fr=1, as show below, the target yaw moment Ms is corrected by the correction gain α. When the return flag is Fr=0, the correction of the target yaw moment Ms is not made. The other execution is the same as the above step S10.

$$Ms \leftarrow Ms \times \alpha$$

(Operation)

In the present embodiment, when the return flag is set to Fr=1, until the setting time Tc elapses, by multiplying the target yaw moment Ms by the correction gain α, this target yaw moment Ms is corrected (step S31). Thus, when the correction gain α is smaller than 1, the target yaw moment Ms becomes smaller than an original value. With this, it is possible to restrict the intervention of the unnecessary control that suppresses the lateral movement operated by the driver to simply attempt to return to the lateral position where the vehicle had been running before the avoidance.

The other operation and effect are the same as the above second embodiment.

(Example of Application)

In the present embodiment, the correction is made by multiplying the target yaw moment Ms by the correction gain α. However, the present invention is not limited to this. As a matter of course, the correction could be made by multiplying the target hydraulic pressures $P_{FL}$~$P_{RR}$ or the braking force difference ΔPf, ΔPr between the left and right wheels by the correction gain α.

(Effect)

In the present invention described above, the process of step S31 is included in the restricting means.

(1) The restricting means restricts the suppression of the lateral movement executed by the running controlling means by correcting a suppression amount when the running controlling means suppresses the lateral movement of the vehicle so as to decrease the suppression amount.

With this, it is possible to surely restrict the intervention of the unnecessary control.

| EXPLANATION OF REFERENCE SIGN | |
|---|---|
| 2 | FL~2 RR wheel cylinders |
| 3 | brake actuator |
| 4 | controller |
| 5 | camera |
| 6 | L · 6 R radar devices |
| 10 | pressure sensor |

-continued

EXPLANATION OF REFERENCE SIGN

| | |
|---|---|
| 11 | steering wheel angle sensor |
| 12 | road wheel speed sensor |
| 13 | direction indicator switch |
| 14 | navigation unit |
| 20 | warning device |

The invention claimed is:

1. A running control device comprising:
a lateral object detecting unit that detects a lateral object which exists on a side of a vehicle travelling in a traffic lane;
a side vehicle detecting unit that detects a side vehicle travelling in an adjacent lane adjacent to the traffic lane;
a later-arriving position estimating unit that estimates a later-arriving lateral position at which the vehicle arrives after a lapse of a predetermined time, with respect to the traffic lane;
a running controlling unit that suppresses a lateral movement of the vehicle in a direction to a side of the lateral object when judging that the later-arriving lateral position estimated by the later-arriving position estimating unit reaches a position of the lateral object side with respect to a predetermined lateral position under a condition in which the lateral object detecting unit detects the lateral object;
an avoidance movement detecting unit that detects that the vehicle laterally moves in a direction opposite to the side of the lateral object; and
a restricting unit configured to:
(1) restrict the suppression of the lateral movement executed by the running controlling unit after the avoidance movement detecting unit detects the lateral movement of the vehicle when it is judged that the vehicle is not changing to the adjacent lane in which the side vehicle is detected regardless of a distance between the vehicle and the side vehicle that is traveling in the adjacent lane; and
(2) allow the suppression of the lateral movement executed by the running controlling unit after the avoidance movement detecting unit detects the lateral movement of the vehicle when it is judged that the vehicle is changing to the adjacent lane in which the side vehicle is detected.

2. The running control device as claimed in claim 1, wherein:
after the avoidance movement detecting unit detects the lateral movement of the vehicle, the restricting unit restricts the suppression of the lateral movement executed by the running controlling unit so that the greater the lateral movement in the direction opposite to the side of the lateral object, the greater the suppression of the lateral movement in the direction to the side of the lateral object.

3. The running control device as claimed in claim 1, wherein:
after the avoidance movement detecting unit detects the lateral movement of the vehicle, the restricting unit restricts the suppression of the lateral movement executed by the running controlling unit so that the greater the lateral speed in the direction opposite to the side of the lateral object, the greater the suppression of the lateral movement in the direction to the side of the lateral object.

4. The running control device as claimed in claim 1, further comprising:
a return movement detecting unit that detects that the vehicle laterally moves in the direction to the side of the lateral object after the avoidance movement detecting unit detects the lateral movement of the vehicle, and wherein
the restricting unit restricts the suppression of the lateral movement executed by the running controlling unit when the return movement detecting unit detects the lateral movement of the vehicle.

5. The running control device as claimed in claim 4, wherein:
the restricting unit restricts the suppression of the lateral movement executed by the running controlling unit for a time period from a time point at which the return movement detecting unit detects the lateral movement of the vehicle until a current lateral position of the vehicle with respect to the traffic lane returns to an initial lateral position when the avoidance movement detecting unit detects the lateral movement of the vehicle.

6. The running control device as claimed in claim 1, wherein:
the restricting unit restricts the suppression of the lateral movement executed by the running controlling unit by correcting at least one of the later-arriving lateral position and the predetermined lateral position so that the later-arriving lateral position estimated by the later-arriving position estimating unit is less apt to reach the predetermined lateral position.

7. The running control device as claimed in claim 6, wherein:
the restricting unit corrects the later-arriving lateral position by correcting the predetermined time.

8. The running control device as claimed in claim 1, wherein:
the lateral object detecting unit detects the lateral object which exists in a detection distance of the side of the vehicle, and
the restricting unit restricts the suppression of the lateral movement executed by the running controlling unit by correcting the detection distance of the lateral object detecting unit so as to decrease the detection distance.

9. The running control device as claimed in claim 1, wherein:
the restricting unit restricts the suppression of the lateral movement executed by the running controlling unit by correcting a suppression amount when the running controlling unit suppresses the lateral movement of the vehicle so as to decrease the suppression amount.

10. The running control device as claimed in claim 1, wherein:
the restricting unit forbids the suppression of the lateral movement executed by the running controlling unit.

11. A running control method comprising:
detecting, via a first sensor, a lateral object which exists on a side of a vehicle travelling in a traffic lane,
detecting, via a second sensor, a side vehicle travelling in an adjacent lane adjacent to the traffic lane,
estimating a later-arriving lateral position at which the vehicle arrives after a lapse of a predetermined time, with respect to the traffic lane,
suppressing a lateral movement of the vehicle in a direction to a side of the lateral object when judging that the later-arriving lateral position reaches a predetermined lateral position under a condition in which the lateral object is detected, detecting that the vehicle laterally moves in a direction opposite to the side of the lateral object, restricting, via a controller, the suppression of the lateral movement of the vehicle in the direction to the side of the lateral object after detecting that the vehicle laterally moves in the direction opposite to the side of the lateral object when it is judged that the vehicle is not changing to the adjacent lane in which the side vehicle is detected regardless of a distance between the vehicle and the side vehicle that is traveling in the adjacent lane, and allowing, via the controller, the suppression of the lateral movement of the vehicle in the direction to the side of the lateral object after detecting that the vehicle laterally moves in the direction opposite to the side of the lateral object when it is judged that the vehicle is changing to the adjacent lane in which the side vehicle is detected.

* * * * *